(12) United States Patent
Narang et al.

(10) Patent No.: US 6,991,876 B2
(45) Date of Patent: Jan. 31, 2006

(54) METAL/ACTIVE OXYGEN BATTERIES

(75) Inventors: Subhash Narang, Palo Alto, CA (US); Susanna Ventura, Los Altos, CA (US); Sunity Sharma, Fremont, CA (US)

(73) Assignee: SRI International, Menlo Park, CA (US)

( * ) Notice: Subject to any disclaimer, the term of this patent is extended or adjusted under 35 U.S.C. 154(b) by 345 days.

(21) Appl. No.: 10/264,931

(22) Filed: Oct. 4, 2002

(65) Prior Publication Data

US 2004/0091774 A1   May 13, 2004

Related U.S. Application Data

(60) Provisional application No. 60/350,127, filed on Jan. 18, 2002, provisional application No. 60/327,468, filed on Oct. 5, 2001.

(51) Int. Cl.
*H01M 4/48* (2006.01)
*H01M 4/60* (2006.01)

(52) U.S. Cl. .................................. 429/231.95; 429/213
(58) Field of Classification Search ................ 429/213, 429/231.95
See application file for complete search history.

(56) References Cited

U.S. PATENT DOCUMENTS

| | | | |
|---|---|---|---|
| 3,330,701 A * | 7/1967 | McElhill et al. ............. | 429/213 |
| 3,879,226 A * | 4/1975 | Tomonaga ............... | 429/213 X |
| 5,783,330 A * | 7/1998 | Naoi et al. ............... | 429/213 X |
| 6,569,568 B2 * | 5/2003 | Kobayashi et al. . | 429/231.95 X |

* cited by examiner

*Primary Examiner*—Stephen J. Kalafut
(74) *Attorney, Agent, or Firm*—Lumen Intellectual Property Services, Inc

(57) ABSTRACT

A battery includes an anode comprising a metal, a cathode comprising an active oxygen species, and a non-aqueous electrolyte, wherein oxidation of the metal and reduction of the active oxygen species provides the current of the battery.

14 Claims, 3 Drawing Sheets

METAL/ACTIVE OXYGEN BATTERIES

This application claims the benefit of U.S. provisional patent application with the Ser. No. 60/350,127, filed Jan. 18, 2002, and U.S. provisional patent application with the Ser. No. 60/327,468, filed Oct. 5, 2001, both of which are incorporated herein by reference.

REFERENCE TO GOVERNMENT GRANT

This invention was made with Government support under Contract Number N00014-98-C-0172 awarded by the U.S. Navy Office of Naval Research. The Government has certain rights in the invention.

FIELD OF THE INVENTION

The field of the invention is high energy density batteries.

BACKGROUND OF THE INVENTION

Among numerous other uses, high energy density batteries find various applications in back-up power systems, electric and hybrid vehicles, and consumer electronics. Exemplary applications include data loggers that make measurements in difficult environments (e.g., ocean floor or high altitudes) and larger stand-alone instrumentation (e.g., backup power sources for telephone lines).

Batteries typically comprise two major components, electrodes (an anode and a cathode), and an electrolyte. The electrodes can be viewed as the phase through which charge is carried by electronic movement, and typical electrodes include metals or semiconductors, but may also be solid or liquid. The electrolyte can be viewed as the phase through which charge is carried by the movement of ions. Electrolytes may be any phase on the continuum of liquid to solid, including gels, pastes, fused salts, or ionically conducting solids, such as sodium beta-alumina, which has mobile sodium ions (Bard, Allen J. and Larry R. Faulkner, Electrochemical Methods: Fundamentals and Applications, John Wiley & Sons (New York), 1980).

The individual components of batteries are constantly being investigated for materials and methods that will improve the energy density of the battery, increase the efficiency of the battery, and improve the safety aspects of the use and storage of the battery and its components. Table 1 shows the specific energy densities of exemplary known battery systems.

TABLE 1

SPECIFIC ENERGY DENSITY OF MAJOR BATTERY SYSTEMS[1]

| | SPECIFIC ENERGY (WH/KG) |
|---|---|
| PRIMARY BATTERY | |
| Zn/air | 370 |
| Li/SOCl$_2$ | 590 |
| Li/SO$_2$ | 260 |
| Li/MnO$_2$ | 230 |
| Li/FeS$_2$ | 260 |
| Li/(CF$_x$)$_n$ | 250 |
| Li/I$_2$ | 245 |

TABLE 1-continued

SPECIFIC ENERGY DENSITY OF MAJOR BATTERY SYSTEMS[1]

| | SPECIFIC ENERGY (WH/KG) |
|---|---|
| SECONDARY BATTERY | |
| Lithium-ion | 150 |
| Lithium/iron disulfide[2] | 180 |
| Sodium/sulfur[2] | 170 |

[1]D. Linden and T. B. Reddy, "Handbook of Batteries", 3rd edition (2001)
[2]High temperature batteries.

In addition to these major battery systems, other experimental high energy density batteries are being developed. An example is the lithium/water battery. Prototype lithium/water batteries using a 30-cm diameter, 30-cm thick solid cylindrical lithium anode with a weight of 11.5 Kg have been designed to deliver 2 W at 1.4V for about one year with a specific energy of 1800 to 2400 Wh/Kg, based on lithium only since the water is continuously pumped to the anode. Various patents have disclosed the use and modification of lithium-water batteries (see e.g., U.S. Pat. No. 5,376,475 issued to Ovshinsky et al.; U.S. Pat. No. 5,427,873 issued to Shuster; U.S. Pat. No. 4,001,043 issued to Momyer; U.S. Pat. No. 4,709,882 issued to Galbraith). Generally, lithium has been the anode material of choice for these batteries because of its high voltage, reactivity, high capacity and low equivalent weight. However, the addition of water to lithium batteries has proven to lower the specific energy and efficiency of the battery relative to other similar batteries.

Lithium/water batteries also produce hydrogen gas as a product of the electrochemical reaction in the cells. The production of hydrogen gas creates an explosion hazard and is, therefore, considered highly unsafe. The lithium/air and aluminum/air batteries have the highest theoretical specific energy and good efficiency, but air needs to be fed to the cathode in order for the battery to operate. There are other combinations of materials that are used in a "sealed" battery—such that air cannot reach or "be fed" to the cathode. Lithium/hydrogen peroxide batteries generally employ the following electrochemical cell reaction:

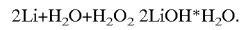

2Li+H$_2$O+H$_2$O$_2$ 2LiOH*H$_2$O.

Although the lithium/hydrogen peroxide battery does not electrochemically produce any hydrogen gas in significant quantities, it nevertheless includes hydrogen peroxide, which is inherently unstable and is known to decompose with the release of oxygen even at room temperature. On the other hand, lithium may chemically react with water in a parasitic corrosion reaction that produces no electricity but produces hydrogen. This release of oxygen and hydrogen makes the lithium hydrogen peroxide battery intrinsically unstable. Therefore, there is still a need to develop batteries that have a relatively high specific energy density, have high efficiencies, can be sealed, are intrinsically more stable, and are relatively safe to store and operate.

SUMMARY OF THE INVENTION

The present invention is directed to configurations and methods for a battery having a non-aqueous electrolyte, and in which an anode includes a metal, a cathode includes an active oxygen species, and wherein oxidation of the metal and reduction of the active oxygen species provides the current of the battery.

In one aspect of the inventive subject matter, suitable metals include an alkali metal, an alkaline-earth metal, and aluminum, and it is particularly preferred that the metal is lithium, sodium, magnesium, or aluminum. Where the active oxygen containing species is inorganic, it is generally preferred that the active oxygen species is ionically coupled to a metal, and most preferably to lithium (thereby forming lithium peroxide). On the other hand, where the active oxygen containing species is organic, it is generally preferred that the active oxygen species is covalently coupled to an organic peroxide-containing material.

Especially preferred electrolytes are non-aqueous electrolyte (typically substantially free of water), and exemplary preferred electrolytes include lithium hexafluorophosphate in ethylene carbonate and dimethyl carbonate, or a mixture of ethylene carbonate, dimethyl carbonate, and triethylphosphate. Alternatively, the electrolyte may comprise a polymer electrolyte.

In further especially preferred aspects, the metal is selected from the group consisting of lithium, magnesium, cesium, and aluminum, and the active oxygen species is provided by lithium peroxide (which may or may not be dispersed in a carrier carbon-containing carrier (e.g., carbon nanotubes or carbon black)).

Various objects, features, aspects and advantages of the present invention will become more apparent from the following detailed description of preferred embodiments of the invention, along with the accompanying drawings.

DETAILED DESCRIPTION

Figure 1:
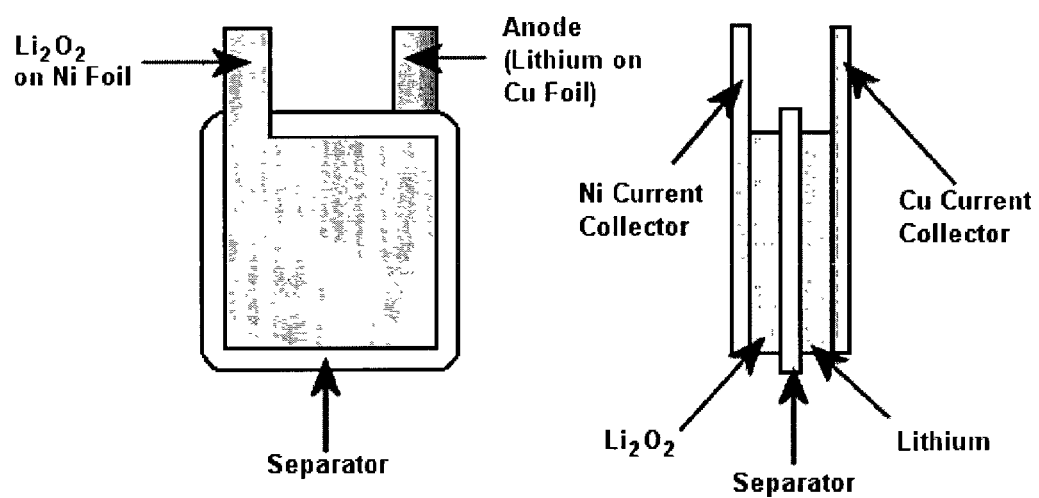
FIG. 1 is a schematic side and frontal view of an exemplary battery configuration according to the inventive subject matter.

The present invention is directed to materials, configurations, and methods of batteries in which a metal and an active oxygen form a redox couple that generates the current provided by the battery. Particularly contemplated metal/active oxygen batteries are those that comprise a metal comprising anode, an active oxygen-containing cathode, an electrolyte, and an optional electrolyte additive.

To avoid possible confusion between a single cell and a battery which may have one or more cells, the terms "cell" and "battery" are used interchangeably, except where the context clearly indicates otherwise. As used herein the term "electrode" is used to mean a phase through which charge is carried by electronic movement. Electrodes can be metals or semiconductors, and they can be solid or liquid. Also as used herein, the term "electrolyte" is generally defined as a phase through which charge is carried by the movement of ions. Electrolytes may be any phase on the continuum of liquid to solid, including gels, pastes, fused salts, or ionically conducting solids, such as sodium β-alumina, which has mobile sodium ions. As used herein the terms "anode material" and "anode" are used interchangeably, except where the context clearly indicates otherwise. Similarly, the terms "cathode material" and "cathode" are used interchangeably. These definitions are intended to eliminate confusion over the exact point at which the respective electrode material(s) is incorporated into, and thus becomes an electrode.

With respect to the anode, it is generally contemplated that the anode comprises at least one metal, preferably an alkali metal, an alkaline-earth metal, a transition metal, or aluminum. The term "metal" as used herein broadly refers to a material having metallic properties, including metallic luster, electrical conductivity, and substantial physical strength. Particularly preferred metals include one or more elements selected from one of the metal and transition metal groups of the periodic table, alloys of such metals, metal ceramics (inclusions), superalloys, fusible alloys, metal intercalation compounds or materials, and amalgams. As further used herein, the term "alkali metal" refers to those elements that are in the IA group of the periodic table (e.g., lithium, sodium, potassium, rubidium, cesium and francium).

Where contemplated metals are alkali metals, lithium, sodium, and potassium are preferred, and especially lithium and sodium (and most preferably lithium). As still further used herein, the phrase "earth-alkaline metal" refers to elements that are in the IIA group of the periodic table (e.g., beryllium, magnesium, calcium, barium, strontium and radium). Where contemplated metals are earth-alkaline metals, beryllium and magnesium are preferred. Furthermore, as used herein, the phrase "transition metal" refers to elements that are in the d-block and f-block of the Periodic Chart of the Elements, which may exhibit a variety of oxidation states, and which may form numerous complex ions. As used herein, the term "d-block" refers to those elements that have electrons filling the 3d, 4d, 5d, and 6d orbitals, and the term "f-block" refers to those elements that have electrons filling the 4f and 5f orbitals (including lanthamides and the actinides). Preferred transition metals are those transition metals that are desirable for use in the electronics, computer, and semiconductor industries. Consequently, contemplated transition metals include cobalt, copper, nickel, vanadium, chromium, platinum, gold, silver, tungsten, and molybdenum. More preferred transition metals include copper, nickel, platinum, gold, silver, and tungsten, and even more preferred transition metals include zinc, copper and nickel. The term "transition metal" also includes alloys, metal/metal composites, metal ceramic composites, and metal polymer composites, as well as other metal composites.

The anode material may advantageously be supported by a current collector. Platinum, gold, nickel, copper, stainless steel, and titanium are all suitable current collectors. The anode material may also be bound to the support by a suitable binder, such as fluororesin, polyvinylidene fluoride, ethylene-propylene-diene copolymer, styrene-butadiene rubber, carboxymethylcellulose, and the like. Such binders may be present in any appropriate amount from about 1% to about 20% by weight of the active electrode material, and more preferably from about 5% to about 10% by weight. A conducting filler may also be present with the binder, such as acetylene black, carbon nanotubes or graphite in an amount of from about 1% to about 20% of the weight of the binder and active electrode material and preferably from about 2% to about 5%.

With respect to the cathode material, is contemplated that the cathode material comprises any material that includes an active oxygen species ionically or covalently bound to a metal, carbon, silicon or other suitable element. The term "active oxygen species" as used herein refers to a reactive, and especially to $O_2^-$ and $O_2^{2-}$. While not excluded from the definition of active oxygen species, $H_2O_2$ is generally not preferred as material comprising an active oxygen species.

Suitable cathode materials may therefore include organic, inorganic, organometallic or polymeric materials. For example, organic compounds and materials may comprise any suitable combination of alkyl, alkenyl, alkoxy or aryl groups, as long as the organic compound or material comprises an active oxygen species or the ability to generate an active oxygen species.

The term "alkyl" is used herein to mean a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain 1 to 12 carbon atoms. The term "alkenyl" is used herein to mean a branched or unbranched hydrocarbon chain containing from 2 to 24 carbon atoms and at least one double bond. Preferred alkenyl groups herein contain 1 to 12 carbon atoms. The term "alkoxy" is used herein to mean an alkyl group bound through a single, terminal ether linkage; that is, an "alkoxy" group may be defined as —OR wherein R is alkyl as defined above. The term "aryl" is used herein to mean a monocyclic aromatic species of 5 to 7 carbon atoms, and is typically phenyl. Optionally, these groups are substituted with one to four, more preferably one to two, lower alkyl, lower alkoxy, hydroxy, and/or nitro substituents. "Optional" or "optionally" means that the subsequently described circumstance may or may not occur, and that the description includes instances in which said circumstance occurs and instances in which it does not. For example, the phrase "Optionally, these groups are substituted." means that these groups may or may not be substituted and that the description includes both the instance when the groups are substituted and the instance when the groups are not substituted. The term "aralkylene" is used herein to mean moieties containing both alkylene and monocyclic aryl species, typically containing less than about 12 carbon atoms in the alkylene portion, and wherein the aryl substituent is bonded to the structure of interest through an alkylene linking group. Exemplary aralkylene groups have the structure —$(CH_2)_j$-Ar wherein "j" is an integer in the range of 1 to 6 and wherein "Ar" is an aryl species.

Organic materials contemplated herein may also comprise polymers and/or monomers. Preferred organic materials are those that are peroxide-based. The term "peroxide-based" is used herein to mean any compound that contains a bivalent O—O group, which in other words means that the oxygen atoms are univalent. Thus, exemplary contemplated organic peroxides include acetyl acetone peroxide, acetyl benzoyl peroxide, acetyl cyclohexanesulphonyl peroxide, tert-amyl hydroperoxide, tert-amyl peroxyacetate, tert-amyl peroxybenzoate, tert-amyl peroxy-2-ethylhexanoate, tert-amyl peroxy-2-ethylhexyl carbonate, tert-amyl peroxyneodecanoate, tert-amyl peroxypivalate, tert-amylperoxy-3,5,5-trimethylhexanoate, tert-butyl cumyl peroxide, n-butyl-4,4-di-(tert-butylperoxy)valerate, tert-butyl hydroperoxide, tert-butyl hydroperoxide+di-tert-butylperoxide, tert-butyl monoperoxymaleate, and tert-butyl monoperoxyphthalate.

Suitable inorganic compounds and materials for cathode materials are those that comprise an active oxygen species or the ability to generate an active oxygen species. Preferred inorganic compounds are inorganic peroxides, such as bis(trimethylsilyl)peroxide, halogen oxides, chlorine oxide, haloites, chlorites, etc. The terms "halogen" and "halo" are used to mean fluoro, chloro, bromo, or iodo, and usually relates to halo substitution for a hydrogen atom in an organic compound.

In yet further alternative aspects, cathode materials may also comprise metal peroxides or superoxides, such as lithium peroxide, sodium peroxide, lithium superoxide, sodium superoxide, etc. While not limiting to the inventive subject matter, it is generally preferred that the cathode material is thermally stable and has a small particle size (e.g., particles between 100 micrometers and 10 nanometers, and more preferably between 10 micrometers and 50 nanometers).

Where appropriate, it is contemplated that the cathode material may also include a metal intercalation compound or material. The phrase "metal intercalation compound or material" is used herein to mean a compound comprised of a crystalline lattice that acts as an electron donor and "foreign" electron acceptor atoms interspersed or diffused between the planes of the lattice. Contemplated intercalation compounds are those compounds that comprise orderly stacked layers of crystals, such as graphite. Preferred metal intercalation compounds or materials are those that comprise graphite; alkali metals, such as lithium; transition metals, such as copper, silver, zinc or nickel; tin-based composites; anhydrous metal nitrates, such as copper and zinc nitrates; metal nitrides, such as trilithium nitride; titanium disulfides and metal dioxides. Most preferred metal intercalation compounds are those that comprise graphite. Furthermore, preferred anode materials include those that comprise active materials that have a small particle size, such as those particles with sizes that are between 100 micrometers and 10 nanometers, and more preferably those particles with sizes that are between 10 micrometers and 50 nanometers.

Cathode materials may also be formulated with suitable binders, additives or other compositions. Preferable additives to the cathode materials comprise platinum black and at least one polymer binder, such as polyvinylidene fluoride (PVDF). The platinum black may also be replaced with platinum supported on carbon or platinum-coated metal powders, such as aluminum and copper. Conductive nonreactive additives may also be used.

With respect to the electrolyte, it is generally contemplated that suitable electrolytes may occur in any form, including liquid, semi-solid, or even solid. Of course, the electrolyte must cooperate with the active electrode material(s) to provide chemical reactions that store and release electrical energy, and many such chemistries are already known. Thus, for lithium ion batteries, the electrolyte is generally selected from a lithium ion-conducting chemical such as lithium hexafluorophosphate in ethylene carbonate and dimethyl carbonate, or a mixture of ethylene carbonate/dimethyl carbonate/triethylphosphate.

It should be especially appreciated that suitable electrolytes are non-aqueous electrolytes, wherein the term "non-aqueous electrolytes" refers to any electrolyte with a water content of less than 1% (by vol.), more typically less than 0.5% (by vol.), and most typically less than 0.1% (by vol.). Where contemplated batteries are secondary batteries (and both, primary and secondary batteries are contemplated), it is generally preferred that the water content of suitable electrolytes is less than 100 ppm, more typically less than 50 ppm, and most typically less than 30 ppm. Also, for safe operation of the cell, the electrolyte may advantageously be chosen from a non-flammable group of chemicals.

The terms "fire-retardant", "flame-retardant", "fire-resistant" and "nonflammable" are used interchangeably herein to mean a reduction or elimination of the tendency of a combustible material to burn, i.e., a "fire-retardant" material is one having a lower ignition susceptibility or, once ignited, lower flammability. Thus, a fire-retardant electrolyte composition is one in which the basic flammability has been reduced as measured by accelerated rate calorimetry (see, e.g. Von Slacken et al. *Proc. Seventh Int'l Meeting on Lithium Batteries*, p. 12 (1994)), or by one of the art-accepted standard flame or heat impingement tests, or other standard test of reduced flammability, for example, ASTM D2863 (limiting oxygen index) (see, e.g., *Tests for Flammability of Plastic Materials for Parts in Devices and Appliances*, Underwriters Laboratories, Northbrook, Ill., 1991; *National Fire Codes*, National Fire Protection Association, Quincy, Mass., 1992; *Standard Test Method for Heat and Visible Smoke Release Rates for Materials and Products*, American Society for Testing and Material, Philadelphia, Pa., 1991; see, also, "Fire Retardants" in Encyclopedia of Polymer Science and Engineering, Second Edition, Vol. 10, pp. 930–1022, John Wiley & Sons (New York), 1988).

Preferably, electrolytes and electrolyte materials comprise organic liquid electrolytes, such as sulfolane, propylene carbonate, ethylene carbonate or linear carbonates. Metal salts and inorganic electrolytes may also be used, such as lithium hexafluorophosphate or lithium triflate. Most preferably, contemplated electrolytes comprise aprotic dipolar solvent electrolytes that will allow the battery to operate at higher voltages and will avoid parasitic reactions at the anode and cathode.

In yet further contemplated aspects or the inventive subject matter, the electrolyte may comprise polymeric materials that are molecularly arranged as linear, branched, cross-linked, cyclolinear, ladder, cyclomatrix, copolymer, terpolymer, or graft copolymer. Electrolytes may further comprise polymeric materials that can be defined with respect to phase as a thermoplastic, an elastomer, a plasticizer, a thermosetting resin or a polymer blend. For example, several polymer electrolytes are deemed suitable for use in high temperature conditions (e.g., those commonly experienced in batteries or fuel cells).

Examples of high temperature perfluorinated polymer electrolytes include perfluorosulfo poly(p-phenylenes), perfluorosulfo poly(p-phenyleneoxide), perfluorosulfo poly(p-phenylenesulfide), perfluorosulfo poly(p-phenylenesulfones), perfluorosulfo aromatic polyamides, perfluorosulfo aromatic polycarbonates, perfluorosulfo polyimides, perfluorosulfo polybenzazoles, perfluorosulfo poly(quinoxalines), perfluorosulfo poly(quinolines), and other perfluorosulfo high temperature polymers whose corresponding non-fluorinated non-sulfonated analogs are described by C. Arnold in Journal of Polymer Science: Macromolecular Reviews, vol. 14, pp. 265–378 (1979), K. Hodd in Trends in Polymer Science, vol. 1 no. 5, pp. 129–137 (May 1993), Chyi-Shan Wang in Trends in Polymer Science, vol. 1, no. 7, pp. 199–205 (July 1993), and references therein, and in Advances in Polymer Science, vol. 117 "High Performance Polymers", Springer-Verlag (1994). High temperature polymer electrolytes can also be formulated from blends, interpenetrating or semi-interpenetrating networks containing the described polymers, or by preparing composites of the described polymers with ceramics, such as alumina or silica. Furthermore, it is contemplated that the electrolyte may be stable or unstable on the electrode. Many known electrolytes having desirable characteristics such as low volatility, high flash point, low freezing point, or high dielectric constant, for example, are unstable on the electrodes.

To avoid the possibility of electrical short circuits, a separator or a solid polymer electrolyte may be disposed between the anode and cathode. Separators may comprise any suitable material such as a non-woven cloth of synthetic resin such as polytetrafluoroethylene, polypropylene, or polyethylene, or a woven porous body of such materials, polymer electrolytes and ceramic filled polymer electrolytes, or combinations of multi-layer composites.

Some examples of solid polymer electrolytes which carry a negative charge and have a positively charged ionic species associated with them are described in U.S. Pat. No. 5,102,751 to Narang et al. (April 1992), incorporated herein by reference above. Examples of solid polymer electrolytes which are covalently functionalized with a moiety carrying an ionic species include those described in U.S. Pat. No. 5,548,055 issued to Narang et al. (August 1996), also incorporated herein by reference above.

Mechanically strong electrolyte films which have conductivities higher that $10^{-3}$ S/cm may be formed from a combination of a liquid electrolyte plasticizer as disclosed and claimed herein or mixtures of such plasticizers, a strengthening material such as PVdF, a salt of the formula C-A, and, optionally, a solid polymer electrolyte and/or a high dielectric constant solvent such as propylene carbonate ("PC"), ethylene carbonate ("EC"), dimethoxyethane ("DME"), methoxyethoxy ethyl ether ("MEE"), and the like (see Table III). Preferably C-A is a lithium salt and the solid polymer electrolyte is a single-ion conductor polymer electrolyte as disclosed in U.S. Pat. No. 5,548,055 issued to Narang et al., incorporated herein by reference above. It may be necessary to add a glyme (e.g., dimethoxyethane ($C_4H_{10}O_2$), diglyme ($C_6H_{14}O_3$), triglyme ($C_8H_{18}O_4$), tetraglyme ($C_{10}H_{22}O_5$) or so on) to form a homogeneous blend of the SPE with PVdF; such compounds will typically serve not only as solvents but as additional plasticizing agents as well.

In a particularly preferred aspect of the inventive subject matter, the redox couple that provides current in a battery is formed by lithium as anode material and lithium peroxide as cathode material. It should be especially appreciated that a lithium/lithium peroxide battery will offer high energy density because it is based on the redox couple of a very strong oxidizing agent, $Li_2O_2$, and an alkali metal, lithium. Lithium being the lightest among the alkali metals, provides highest energy density to the redox couple. The electrochemical cell reaction of the lithium-lithium peroxide battery is:

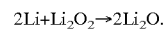
$2Li+Li_2O_2 \rightarrow 2Li_2O$.

The two half-cell reactions for the Li—$Li_2O_2$ pair are:

(1) Anode reaction: Li→$Li^+$+$e^-$, and (2) Cathode reaction: $Li_2O_2$+$2e^-$+$2Li^+$→$2Li_2O$.

By using an organic solvent, the parasitic reaction (a) of lithium metal chemically reacting with water to liberate hydrogen is avoided.

(a) $2Li+2H_2O \rightarrow 2LiOH+H_2$

The theoretical open-circuit voltage of the lithium/lithium peroxide battery is 2.96V, as estimated from the free energy formation of lithium peroxide (−136.5 kcal/gmole). Based on the lithium peroxide electrochemical equivalent of 1168 mAh/g, the theoretical specific energy of the lithium/lithium peroxide battery is 2569 Wh/Kg. The theoretical energy density is also very high (more than 5000 Wh/L) since the battery density is about 2.

Therefore, it should be appreciated that contemplated lithium/lithium peroxide batteries have numerous advantages, including highest theoretical energy density, high voltage battery (organic aprotic solvents are used as the liquid electrolyte), and no gaseous product is formed from the electrochemical reaction.

However, it should be recognized that numerous alternative combinations between metals and active oxygen species may also be employed, and the following will provide an exemplary selection of suitable redox couples and their reactions.

Magnesium/Lithium Peroxide Battery: Lithium peroxide (like other metal peroxides) is thermodynamically stable at room temperature. The magnesium/lithium peroxide battery is thought to provide high energy density because it is based on the redox couple of a very strong oxidizing agent, $Li_2O_2$, and an alkaline-earth metal—magnesium. Lithium being the lightest among the alkali metals, provides highest energy density to the redox couple.

The two half-cell reactions for the Mg—$Li_2O_2$ pair are:
(1) Anode reaction: $Mg \rightarrow Mg^{2+}+2e^-$, and
(2) Cathode reaction: $Li_2O_2+2e^-+Mg^{2+} \rightarrow Li_2O+MgO$.
Thus the overall cell reaction is:
(3) $Mg+Li_2O_2 \rightarrow Li_2O+MgO$.

By using an organic solvent, the parasitic reaction (a) of magnesium metal chemically reacting with water to liberate hydrogen is avoided.
(a) $2Mg+2H_2O \rightarrow 2MgOH+H_2$ Lithium/Sodium Peroxide Battery: Sodium peroxide (like other metal peroxides) is thermodynamically stable at room temperature. The lithium/sodium peroxide battery offers high energy density because it is based on the redox couple of a very strong oxidizing agent, $Na_2O_2$, and an alkali metal, lithium. Lithium being the lightest among the alkali metals, provides highest energy density to the redox couple.

The two half-cell reactions for the Li—$Na_2O_2$ pair are:
(1) Anode reaction: $2Li \rightarrow 2Li^++2e^-$, and
(2) Cathode reaction: $Na_2O_2+2e^-+2Li^+ \rightarrow Na_2O+Li_2O$.
Thus the overall cell reaction is:
(3) $2Li+Na_2O_2 \rightarrow Na_2O+Li_2O$.

By using an organic solvent, the parasitic reaction (a) of lithium metal chemically reacting with water to liberate hydrogen is avoided.
(a) $2Li+2H_2O \rightarrow 2LiOH+H_2$ Cesium/Potassium Superoxide Battery: Potassium superoxide (like other metal superoxides) is thermodynamically stable at room temperature. The cesium/potassium superoxide battery offers high energy density because it is based on the redox couple of a very strong oxidizing agent, $KO_2$, and an alkaline-earth metal—cesium.

The two half-cell reactions for the Cs—$KO_2$ pair are:
(1) Anode reaction: $3Cs \rightarrow 3Cs^++3e^-$, and
(2) Cathode reaction: $KO_2+3e^-+3Cs^+ \rightarrow KCsO+Cs_2O$.
Thus the overall cell reaction is:
(3) $3Cs+KO_2 \rightarrow KCsO+Cs_2O$.

Aluminum/Lithium Peroxide Battery: Lithium peroxide (like other metal peroxides) is thermodynamically stable at room temperature. The aluminum/lithium peroxide battery offers high energy density because it is based on the redox couple of a very strong oxidizing agent, $Li_2O_2$, and Group IIIA metal—aluminum. Lithium being the lightest among the alkali metals, provides highest energy density to the redox couple.

The two half-cell reactions for the Cs—$Li_2O_2$ pair are:
(1) Anode reaction: $Al \rightarrow Al^{3+}+3e^-$, and
(2) Cathode reaction: $Li_2O_2+2e^-+Al^{3+} \rightarrow Li_2O+O^{2-}$.
Thus the overall cell reaction is:
(4) $2Al+3Li_2O_2 \rightarrow 3Li_2O+Al_2O_3$.

By using an organic solvent, the parasitic reaction (a) of aluminum metal chemically reacting with water to liberate hydrogen is avoided.
(a) $Al+3H_2O \rightarrow Al(OH)_3+3H_2$

EXAMPLES

Exemplary Cell Design

We have fabricated and tested 10-$cm^2$ $Li/Li_2O_2$ cells with a configuration as illustrated in FIG. 1. A thin film of lithium metal pressed on a copper current collector was used as the anode. The separator was embedded in a 1 M $LiPF_6$ solution in EC/DMC 1:1. The cathode composite electrode based Li$_2$O$_2$ was coated on a thin metal current collector (e.g., platinum plated nickel).

Synthesis of Lithium Peroxide in the Presence of Carbon Nanotubes

Figure 2:
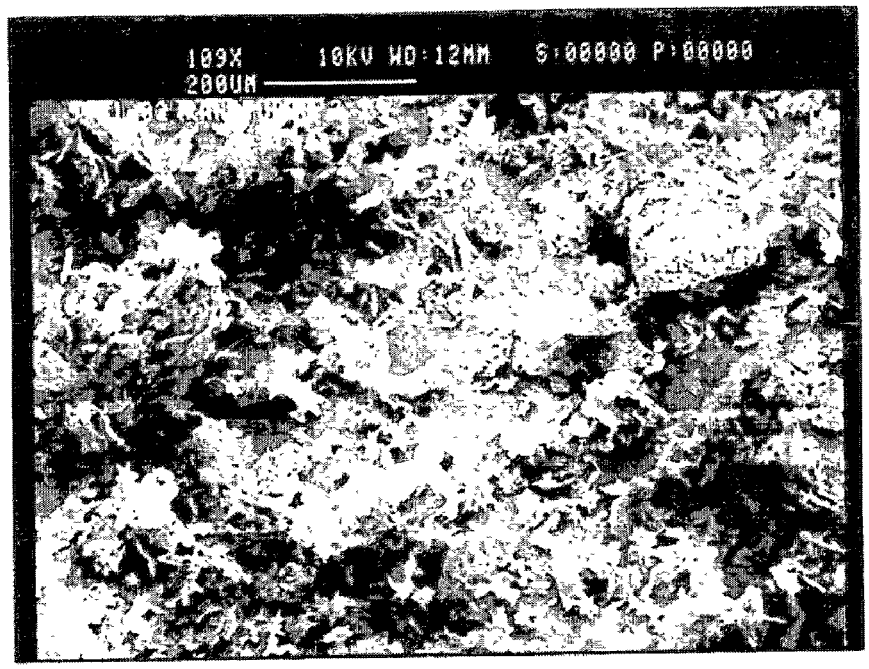
FIG. 2 is a first scanning electron micrograph of an exemplary cathode material according to the inventive subject matter.
Figure 3:
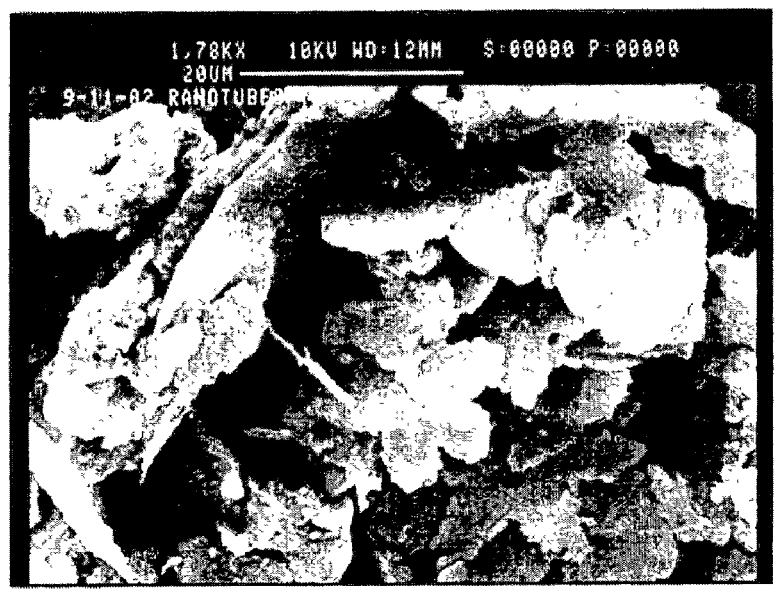
FIG. 3 is a second scanning electron micrograph of an exemplary cathode material according to the inventive subject matter.

Lithium hydroxide (2.4 g) was dissolved in boiling 95% ethanol/5% water (700–800 mL). Single wall carbon nanotubes (0.523 g) were added to the solution. To the boiling mixture, 30% hydrogen peroxide (1.81 g) was added. The resulting precipitate was repeatedly washed with hot 95% ethanol to remove any trace of lithium oxide. After each washing, the solid was isolated by centrifugation. The resulting brownish-black solid was dried at room temperature in a desiccator under active vacuum for a few days. A 50% concentration by weight of lithium peroxide in the solid was determined by iodometric titration. This preparation was performed under inert atmosphere. Scanning electron micrograph images of the cathode material are shown in FIGS. 2 and 3.

Lithium/Lithium Peroxide Battery with Lithium Peroxide/Carbon Nanotube Cathode

Figure 4:
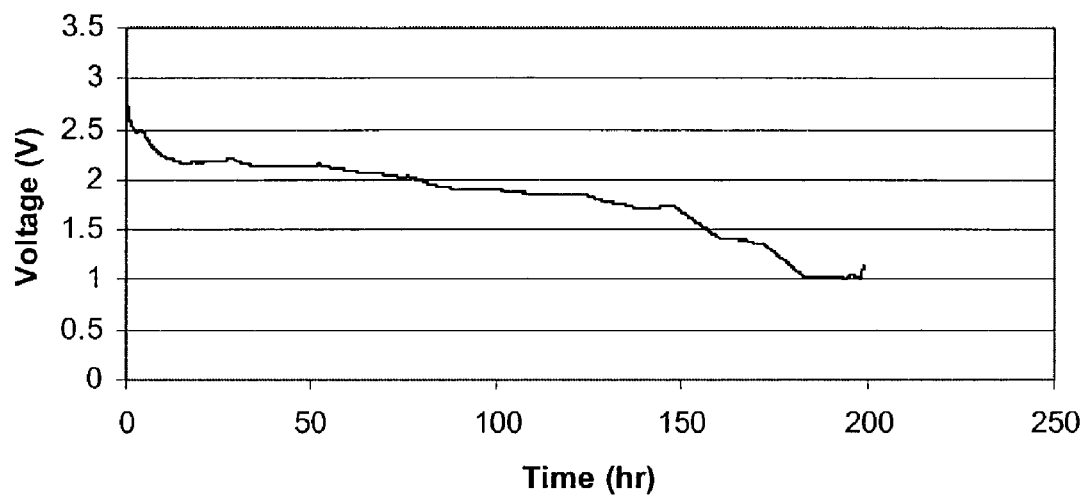
FIG. 4 is a graph indicating a voltage discharge profile of an exemplary lithium/lithium peroxide carbon nanotube battery according to the inventive subject matter.

A 10-$cm^2$ battery with the configuration of FIG. 1 was fabricated and tested. The cathode was fabricated as follows: Lithium peroxide/carbon nanotube mixture (73 mg, 50% lithium peroxide by weight), platinum black (20 mg), Kynar 2822 (7 mg) and Hypermer KD-1 (1 mg) were dispersed in anhydrous ethylmethylcarbonate. The dispersion was applied on a platinized nickel electrode using an air brush in multiple layers. The cathode loading was 35 mg over 10-$cm^2$. The theoretical cathode capacity was calculated to be 14.8 mAh. Metallic lithium was used as the anode material. A glass woven separator was filled with a solution of 1M $LiPF_6$ in EC/DMC (2:1). The open circuit battery voltage was 2.99. The battery was discharged at 0.12 mA over 198 hours to 1V. Full theoretical discharge capacity was obtained. The voltage profile as a function of time is shown in FIG. 4. The specific energy of this battery was estimated to be 830 Wh/Kg (based on the battery active materials).

Alternative Exemplary Lithium/lithium Peroxide Battery

A 10-$cm^2$ battery with a configuration as shown in FIG. 1 was fabricated and tested. The cathode was fabricated as follows: Lithium peroxide (60%, 40 mg), platinum black (53 mg), Kynar 2822 (7 mg) and Hypermer KD-1 (1 mg) were dispersed in ethylmethylcarbonate. The cathode dispersion was sprayed onto a platinized nickel electrode using an airbrush. The total electrode loading was 67 mg. The theoretical cathode capacity was calculated to be 18.7 mAh.

Figure 5:
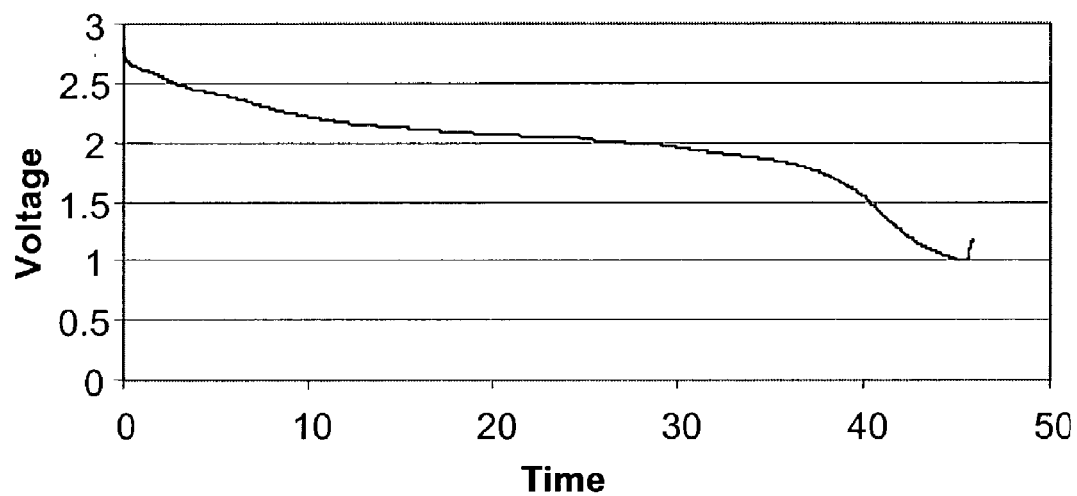
FIG. 5 is a graph indicating a voltage discharge profile of an exemplary lithium/lithium peroxide battery according to the inventive subject matter.

Metallic lithium was used as the anode material. A glass woven separator was filled with a solution of 1M $LiPF_6$ in EC/DMC (2:1). The battery open circuit voltage was 2.8V. The battery was discharged to 1 V at 0.225 mA over a period of 45 hours. The total discharge capacity was 10.22 mA. The voltage discharge profile of the battery is shown in FIG. 5.

Preparation of Lithium Peroxide/Acetylene Black Composite Cathode Material

Lithium hydroxide (2.32 g) was dissolved in boiling 95% ethanol/5% water (700–800 mL). Acetylene black (0.510 g) was added to the solution. To the boiling mixture, 30% hydrogen peroxide (1.75 g) was added. The resulting precipitate was repeatedly washed with hot 95% ethanol to remove any trace of lithium oxide. After each washing, the solid was isolated by centrifugation. The resulting black solid was dried at room temperature in a desiccator under active vacuum for a few days. A 51.1% concentration by weight of lithium peroxide in the solid was determined by iodometric titration. This preparation was performed under inert atmosphere.

It should generally be appreciated that the practice of various aspects of the inventive subject matter presented herein will employ, unless otherwise indicated, conventional techniques of battery fabrication, battery chemistry, and electrolyte chemistry. Furthermore, all patents, patent applications, publications and other types of references cited herein are hereby incorporated by reference in their entirety. However, despite the incorporation of references, the present text does not necessarily adopt the definitions and usages set forth in the references. Therefore, definitions and usages of specific terms are provided above where appropriate. Furthermore, the singular forms "a", "an" and "the" are used herein to include the plural unless the content clearly dictates otherwise. Thus, for example, reference to "an electrolyte additive" includes mixtures of such additives, reference to "the anode material" includes more than one such material, and the like.

Thus, specific embodiments and applications of metal/active oxygen batteries have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A battery comprising
an anode that includes at least one metal selected from the group consisting of an alkali metal, an alkaline-earth metal, lithium, sodium, magnesium, cesium, and aluminum,
a cathode that includes an active oxygen species provided by a peroxide-containing material having a bivalent O—O group, wherein the peroxide-containing material is selected from the group consisting of lithium peroxide, lithium superoxide, and
a non-aqueous electrolyte, wherein oxidation of the metal and reduction of the active oxygen species provides the current of the battery.

2. The battery of claim 1 wherein
the electrolyte comprises lithium hexafluorophospate in ethylene carbonate and dimethyl carbonate, or a mixture of ethylene carbonate, dimethyl carbonate, and triethylphosphate.

3. The battery of claim 1 wherein
the electrolyte comprises a solid polymer electrolyte.

4. The battery of claim 1 wherein
the metal in the anode is lithium.

5. A battery comprising
an anode that includes a metal,
a cathode that includes an active oxygen species, and
a non-aqueous electrolyte, wherein oxidation of the metal and reduction of the active oxygen species provides the current of the battery, wherein
the active oxygen species is ionically coupled to lithium, and wherein
the lithium forms with the active oxygen species lithium peroxide.

6. The battery of claim 5 wherein
the electrolyte comprises lithium hexafluorophospate in ethylene carbonate and dimethyl carbonate, or a mixture of ethylene carbonate, dimethyl carbonate, and triethylphosphate.

7. The battery of claim 5 wherein
the electrolyte comprises a solid polymer electrolyte.

8. The battery of claim 5 wherein
the metal in the anode is lithium.

9. A battery comprising
an anode that includes a metal,
a cathode that includes an active oxygen species, and
a non-aqueous electrolyte, wherein oxidation of the metal and reduction of the active oxygen species provides the current of the battery, wherein
the metal is selected from the group consisting of lithium, magnesium, cesium, and aluminum, and wherein the active oxygen species is provided by lithium peroxide.

10. The battery of claim 9 wherein
the electrolyte comprises lithium hexafluorophospate in ethylene carbonate and dimethyl carbonate, or a mixture of ethylene carbonate, dimethyl carbonate, and triethylphosphate.

11. The battery of claim 9 wherein
the electrolyte comprises a solid polymer electrolyte.

12. The battery of claim 9 wherein
the lithium peroxide is dispersed in a carrier carbon-containing carrier.

13. The battery of claim 12 wherein
the carbon-containing carrier comprises a carbon nanotube or carbon black.

14. The battery of claim 9 wherein
the metal in the anode is lithium.

* * * * *